United States Patent
Riley et al.

(10) Patent No.: US 11,333,091 B2
(45) Date of Patent: *May 17, 2022

(54) EXHAUST GAS TEMPERATURE ASSIST FOR TWO-CYCLE UNIFLOW SCAVENGED DIESEL ENGINES AT LOWER ENGINE LOADS WITH VARIOUS ENGINE OPERATING SCHEMES

(71) Applicant: Yelir, Inc., Fort Collins, CO (US)

(72) Inventors: Michael B. Riley, Fort Collins, CO (US); John Craig Hedrick, Boerne, TX (US); Steven Gerard Fritz, La Vernia, TX (US)

(73) Assignee: Yelir, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,270

(22) Filed: Oct. 12, 2020

(65) Prior Publication Data

US 2021/0054795 A1 Feb. 25, 2021

Related U.S. Application Data

(63) Continuation-in-part of application No. 15/985,172, filed on May 21, 2018, now Pat. No. 10,837,385.

(51) Int. Cl.
| | |
|---|---|
| *F02D 41/00* | (2006.01) |
| *F02D 41/02* | (2006.01) |
| *F02D 13/06* | (2006.01) |
| *F02D 41/14* | (2006.01) |
| *F02B 75/02* | (2006.01) |

(52) U.S. Cl.
CPC ........ *F02D 41/0245* (2013.01); *F02D 13/06* (2013.01); *F02D 41/0007* (2013.01); *F02D 41/0087* (2013.01); *F02D 41/1446* (2013.01); *F02B 2075/025* (2013.01)

(58) Field of Classification Search
CPC .. F02D 41/0245; F02D 13/06; F02D 41/0007; F02D 41/1446; F02D 41/0087; F02B 2075/025
See application file for complete search history.

(56) References Cited

U.S. PATENT DOCUMENTS

| | | | | |
|---|---|---|---|---|
| 5,507,263 A * | 4/1996 | Yamazaki | ........... | F02D 13/0284 123/65 PE |
| 6,041,745 A * | 3/2000 | Asai | .................... | F02D 13/0284 123/73 PP |
| 10,247,072 B2 * | 4/2019 | Younkins | ............... | F01N 3/2033 |
| 2004/0098970 A1 * | 5/2004 | Foster | ................. | F02D 41/0255 60/284 |
| 2005/0205063 A1 * | 9/2005 | Kolmanovsky | ..... | F02D 41/0087 123/436 |
| 2017/0130630 A1 * | 5/2017 | Younkins | ............... | F01N 11/005 |

* cited by examiner

*Primary Examiner* — Matthew T Largi
(74) *Attorney, Agent, or Firm* — Livingston Law Firm

(57) ABSTRACT

A method of raising exhaust gas temperatures of a two-cycle uniflow scavenged engine at lower loads. At lower loads, the exhaust valves are activated with a frequency that is less frequent than every engine cycle. This exhaust valve deactivation may be combined with additional engine operating strategies, such as by using fewer than all cylinders as combusting cylinders, adjusting fueling to combusting cylinders, and reducing compressor output.

20 Claims, 8 Drawing Sheets

EXHAUST GAS TEMPERATURE ASSIST FOR TWO-CYCLE UNIFLOW SCAVENGED DIESEL ENGINES AT LOWER ENGINE LOADS WITH VARIOUS ENGINE OPERATING SCHEMES

RELATED FILING

This patent application is a continuation-in-part of U.S. patent application Ser. No. 15/985,172, entitled "Exhaust Gas Temperature Assist for Two-Cycle Uniflow Scavanged Diesel Engine at Lower Engine Loads, filed May 21, 2018.

TECHNICAL FIELD OF THE INVENTION

This invention relates to two-cycle diesel engines with uniflow scavenging, and more particularly to improving the performance of their exhaust aftertreatment system at lower engine loads by increasing exhaust gas temperatures.

BACKGROUND OF THE INVENTION

The EMD engine, manufactured by Electro-Motive Diesel (now Progress Rail, a Caterpillar Company), is an example of a two-stroke uniflow scavenged diesel engine. It is a medium-speed engine, used in locomotive, marine, and stationary power applications. The engine comes in a 567, 645, and 710 Series and is made in V-8, V-12, V-16, and V-20 configurations. Most locomotive production has been the V-12 and V-16 versions of the engine.

The "uniflow scavenged" feature of such engines requires an external air pump to provide differential air pressure across the cylinders. This air pressure allows the engine to be scavenged correctly, replacing combustion exhaust gases with fresh air.

For an EMD engine, two different air pump systems have been used for scavenging. A "naturally aspirated" engine has a gear-driven Roots-type blower that mechanically scavenges the cylinders. A "forced induction" EMD engine uses a "turbo-supercharger", which drives the forced induction system mechanically at least part of the time. The gear-driven turbocharger provides the required air flow at idle and light-to-moderate loads, thus acting like a supercharger. At higher loads, once the exhaust energy is high enough to sustain the turbocharger, an overriding clutch releases and the turbocharger "comes off the gear" maximizing engine efficiency.

A characteristic of this type of engine is relatively low exhaust temperatures at low loads due to extremely high air/fuel ratios, often over 300:1. These low exhaust temperatures adversely affect catalyst-based exhaust aftertreatment systems, which are typically designed to be most effective at higher loads and higher exhaust temperatures. Various methods have been proposed to improve low-load exhaust temperatures in diesel engines. Such systems include hydrocarbon dosers with a diesel oxidation catalyst (EP2179148B1), late injection in-cylinder to increase late burn (U.S. Pat. No. 6,412,276), diesel burners in the exhaust to burn diesel fuel directly in the exhaust stream (U.S. Pat. Nos. 4,318,887, 4,731,994, 5,826,428, 7,032,376), and electrical heating elements in the exhaust stream (U.S. Pat. No. 5,582,805). A shortcoming of these methods is that fuel economy is worsened by burning fuel that contributes little or nothing to the power output of the engine, while at the same time increasing carbon dioxide emissions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

U.S. patent application Ser. No. 15,985,172, entitled "Exhaust Gas Temperature Assist for Two-Cycle Uniflow Scavenged Diesel Engines at Lower Engine Loads" to Michael B. Riley describes various methods of exhaust valve deactivation (activating exhaust valves with less frequency than every engine cycle).

The following description is directed to systems and methods for operating a two-cycle uniflow scavenged diesel engine in a manner that produces higher exhaust temperatures at lower loads. At lower loads, the engine cylinders' exhaust valves can be activated (opened) at a frequency less than every combustion cycle. This has the effect of raising exhaust gas temperatures. For a further temperature assist, exhaust valve deactivation can be combined with other engine operation strategies, such as reducing the engine's compressor output, using fewer than all cylinders for combustion, and making fueling adjustments to combusting cylinders.

The invention is useful for transportation applications (locomotive and marine), which operate with varying engine speeds and load conditions. It is also useful for power generation applications, where engines run at a constant or synchronous engine speed and simultaneously with a generator to produce alternating current power at various loads. These engines also suffer from low exhaust temperatures at low loads. It should be assumed herein that the term "engine" is used to mean the above-described types of engines, that is, two-cycle uniflow scavenged engines.

Exhaust Gas Temperature Assist, Using Exhaust Valve Deactivation

Figure 1:
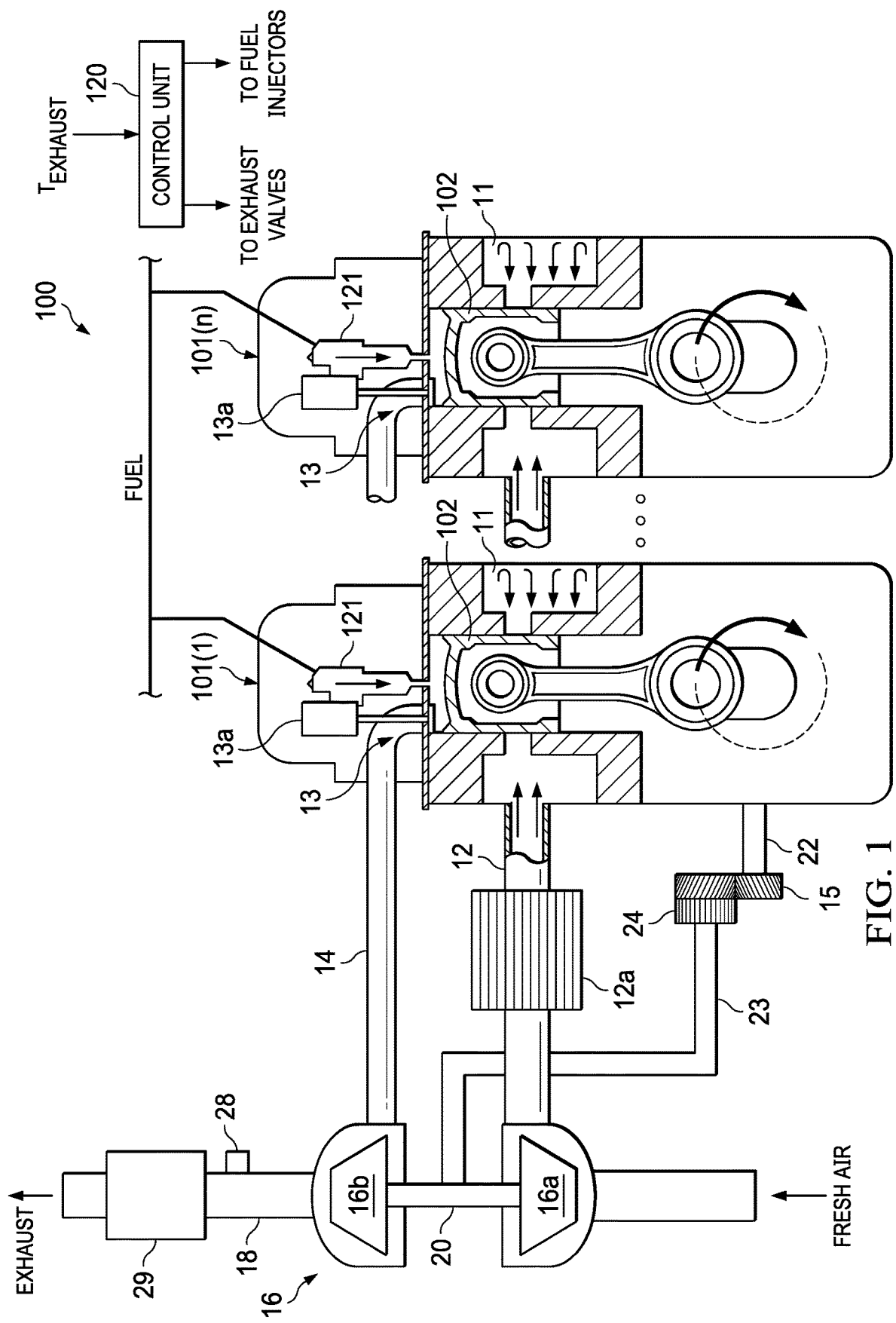
FIG. 1 is a representative drawing of an example of a two-cycle uniflow scavenged diesel engine, which is equipped for exhaust gas temperature assist in accordance with the invention.

FIG. 1 schematically illustrates an example of a two-cycle uniflow scavenged diesel engine 100 in accordance with one embodiment of the invention. Engine 100 is a forced induction engine, having a turbo supercharger 16. As stated in the Background, an example of such an engine is an EMD engine.

Only those parts of engine 100 relevant to the invention are shown. It can be understood that a production engine has many additional electrical and mechanical elements that are typically associated with such an engine.

For purposes of example herein, engine 100 is a 16-cylinder engine. This engine has been and continues to be commercially available as the EMD 645 and 710 Series engine, and is available with more or fewer cylinders. The multiple cylinders are represented in FIG. 1 as cylinders 101(1)-101(n). The size of the engine and the number of cylinders may vary.

For locomotive applications, the throttle notch system of engine 100 is designed with a number of steps, referred to as "notches". Position 1 (Notch 1) is the lowest powered setting where electrical power is delivered to the traction motors. Position 8 (Notch 8) is maximum rated engine speed and the position where maximum power is available.

Fuel is supplied via fuel injectors 121, each cylinder 101 having an associated fuel injector 121. As described below, in some embodiments of the engine, fuel delivery is individually controlled to each cylinder 101. The amount of fuel delivered may be varied among cylinders 101 using electronic fuel control means such as pulse width modulation.

Each cylinder 101 has an intake plenum 11, which transfers air into cylinder 101 when intake transfer ports are uncovered by a piston. Intake plenum 11 receives intake air via an aftercooler 12a and intake manifold 12.

An exhaust valve 13 in the cylinder head expels exhaust from the cylinder 101 to an exhaust manifold 14. In a conventional engine, the exhaust valves 13 are operated every engine cycle. The operation of exhaust valve 13 is activated or deactivated by an exhaust valve actuator 13a.

For the engine described herein, control of each exhaust valve 13 is "active" in the sense that the opening and closing of exhaust valve 13 can be controlled with control signals. This is in contrast to conventional EMD two-stroke engines, in which the exhaust valves are cam-actuated every engine cycle and cannot be controlled variably.

It should be understood that both the intake manifold 12 and exhaust manifold 14 are illustrated in a representative manner and serve additional cylinders 101 of the engine. For purposes of this description, it is assumed that all cylinders 101 operate in the same manner.

A turbo-supercharger 16 is conventional for production EMD engines, and has a compressor 16a and turbine 16b. Turbo-supercharger 16 is the type discussed in the Background—gear-driven with a gearbox 15 and overriding clutch 24. The gearbox 15 transmits rotary motion and torque from shaft 22 to shaft 23 and to compressor shaft 20. The overrunning clutch 24 ensures that rotary motion and torque are transmitted in one direction only.

Gearbox 15 and overrunning clutch 24 drive the compressor 16a during idle and at lower engine loads, when exhaust gas energy is insufficient to fully drive turbine 16b. During this time, the compressor 16a is "mechanically driven". At higher loads, increased exhaust gas temperature and mass flow, and thus enthalpy, is sufficient to drive the turbine 16b, and clutch 24 disengages, such that turbocharger 16 is "off gear" and is "exhaust-driven".

As described below, in other embodiments, the compressor 16a may be driven by other mechanical configurations. For example, compressor 16a may be driven without an overriding clutch. Or compressor 16a may be driven with an electric motor.

Compressor 16a compresses intake air, which then passes through aftercooler 12a before entering intake plenum 11. When exhaust gas leaves the cylinder 101 via exhaust valve 13, the exhaust gas enters turbine 16b. From turbine 16b, exhaust gas exits via exhaust pipe 18 and is delivered to aftertreatment system 29. An exhaust temperature sensor 28 measures exhaust gas temperature, and is typically placed near the inlet to the exhaust aftertreatment system 29. A characteristic of engine 100 is a transport delay between any engine notch or valve operation change and temperature measurement at sensor 28. Control unit 120 has a means for storing or estimating this transport delay. Air mass flow changes with notch level and exhaust valve operation, so a time delay is necessary to ensure that sensor 28 responds appropriately.

In other embodiments, the exhaust aftertreatment system may be positioned before the turbine. In this case, the temperature measurement would still occur before the aftertreatment system.

In accordance with the invention, and as explained in detail below, during lower load engine operating conditions, exhaust valves 13 open to release exhaust gas at a lower frequency than every engine cycle (one engine cycle being one revolution for a two-cycle engine). This is accomplished by "deactivating" valves 13 so that they do not open during a predetermined pattern of engine (combustion) cycles. As one example of the method of the invention, exhaust valves 13 may be deactivated every other engine cycle, which effectively halves the exhaust gas flow from that cylinder 101 compared to if exhaust valves 13 open every engine cycle.

All exhaust valves 13 of the engine are operated in the same manner. By not exhausting gases in the cylinders 101, the air and exhaust products in the cylinders 101 are at an elevated temperature. On the next engine cycle, the exhaust temperature will rise further. When the exhaust valves 13 are opened, the exhaust gas will be hotter than if the exhaust valves were opened (activated) on every engine cycle. It is expected that a temperature increase of 50-80 degrees Celcius can be achieved by deactivating the exhaust valves 13 every other engine cycle.

The embodiment of FIG. 1 may illustrate the case where the exhaust valves 13 are deactivated every other engine cycle. As a more generalized description, exhaust valves 13 are activated M out of N combustion cycles, with M and N being integers, and M less than N. For example, if M were 1 and N were 4, then exhaust valves 13 would be activated (and breathe) every four engine cycles, and the engine would "rebreathe" for the other three engine cycles.

Typically, the lower the load, the more engine cycles might occur without the exhaust valves 13 being activated. Assuming fuel is injected in each cylinder 101 at every revolution, it is feasible that up to eight consecutive engine cycles may occur with the exhaust valves 13 closed, and on the ninth cycle the exhaust valves 13 activated. If fuel were not injected on every cycle, then it is feasible that even more cycles may occur without exhaust valves 13 being activated.

The above-described exhaust temperature assist method is implemented with exhaust temperature control unit 120. It is assumed that control unit 120 has appropriate hardware and software, configured and programmed to perform the process described herein. Control unit 120 may be part of a more comprehensive control system—only those inputs, outputs, and processes relevant to the invention are described herein.

Figure 2:
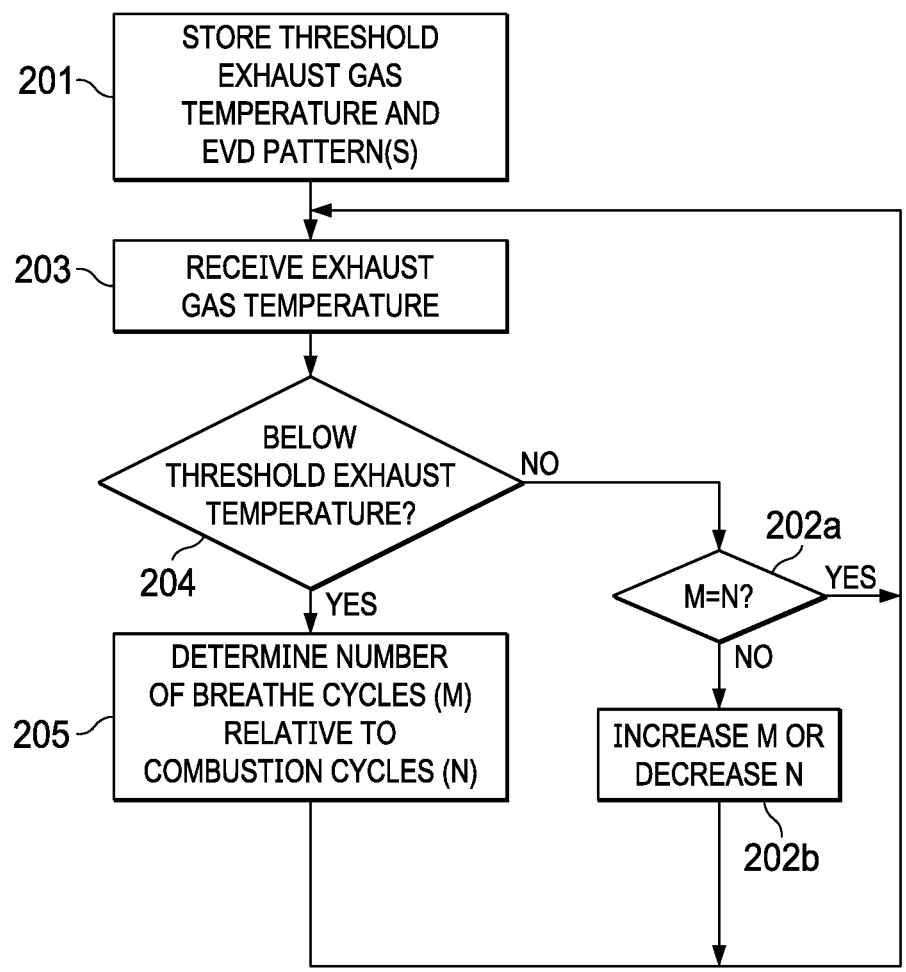
FIG. 2 illustrates a method of increasing exhaust gas temperatures at lower loads, for an engine such as the engine of FIG. 1.

FIG. 2 illustrates an exhaust gas temperature assist method of operating an engine configured as in FIG. 1. However, the method of FIG. 2 is not limited to engines having a turbo-supercharger, and is useful for other engines (two-cycle uniflow scavenged), such as engines having superchargers or blowers or conventional turbochargers.

It is assumed that the engine has a control unit, such as control unit 120, for performing the method. Control unit 120 is programmed to receive the input data referred to below, and to generate control signals to the exhaust valve actuators 13a and to fuel injectors 121.

Step 201 is storing a threshold exhaust gas temperature value, and at least one exhaust valve deactivation (EVD) frequency pattern in control unit 120. These values are stored in memory of control unit 120.

The exhaust gas temperature threshold value represents a temperature below which exhaust gas temperatures require a temperature assist in order for the exhaust aftertreatment system 29 to be optimally effective. The threshold value may vary with the particular engine and expected operating conditions, but it is expected that this threshold will be the load level at Notch 4 (mid load), such that temperature assist of the method of FIG. 2 will be performed at or below that load level. For purposes of this description, load levels below this threshold may be referred to as "mid to low load levels" including idle and dynamic brake. Because the load level may be representative of exhaust gas temperature, in some embodiments, the threshold may be in terms of load levels, which may be considered an equivalent for purposes of measuring or estimating exhaust gas temperatures.

The EVD frequency patterns are one or more patterns of exhaust valve deactivation/activation. As explained above, a ratio M/N, which represents a number of engine cycles in which the exhaust valves are activated (M) relative to a number of normal engine cycles (N). In other words, the engine "breathes" only M cycles of every N combustion cycles, and operates with EVD for N minus M cycles. The "rebreathing" cycles are cycles in which the exhaust valves are deactivated.

Step 203 is receiving the current exhaust gas temperature. Referring again to FIG. 1, exhaust temperature sensor 28 measures exhaust gas temperature upstream the one or more devices of an exhaust gas aftertreatment system. This measurement is delivered as a current exhaust gas temperature value to control unit 120.

Step 204 is a decision step that compares the current exhaust temperature to a threshold exhaust temperature. This threshold exhaust temperature is a predetermined value above which the operation of the exhaust aftertreatment system 29 is deemed functionally desirable for the engine. The threshold exhaust temperature is stored in memory of control unit 120.

If the current exhaust temperature is at or above the threshold temperature, Step 202a is comparing the number of breathe cycles (M) relative to the number of combustion cycles (N). If M is equal to N, the process returns to monitoring the exhaust gas temperature (Step 203) and engine operation continues with normal combustion cycles and without exhaust temperature assist. Typically, in normal exhaust valve operation, the exhaust valves 13 are activated every cycle. This is referred to herein as operating the engine with "normal exhaust valve activation". However if M does not equal N, in Step 202b, M is incremented or N is decremented. Typically, the increment is by 1 or decrement is by 1, respectively, but other patterns are possible. The process then returns to Step 203.

In Step 205, if the current exhaust temperature is below the threshold value, control unit 120 determines an EVD pattern, e.g., a number of "breathing" cycles relative to normal combustion cycles. This determination may be made using a lookup table or an algorithm. A combination of engine speed and load along with exhaust temperatures might be used dynamically, or it may be pre-programmed where lookup tables are used based on ambient temperature conditions, engine coolant temperature, engine lubricant temperature and engine speed and load. Different current exhaust gas temperatures and different load levels may be associated with different EVD patterns.

The process returns to Step 203 to monitor exhaust temperature. As the exhaust temperatures rise to the threshold level, the same or a different EVD pattern may be employed. Once the exhaust gas temperature reaches the threshold level, the engine continues the existing EVD patterns and returns to Step 203, or unless there is a load change.

Exhaust Temperature Assist, Using Exhaust Valve Deactivation and Reduction of Intake Manifold Pressure The temperature assist of the above-described method, performed at lower loads using EVD, can be enhanced if the engine has a compressor whose output can be controlled. As explained below, a compressor having this capability can be used to reduce intake manifold pressure and further increase exhaust temperatures and reduce fuel consumption.

Figure 3:
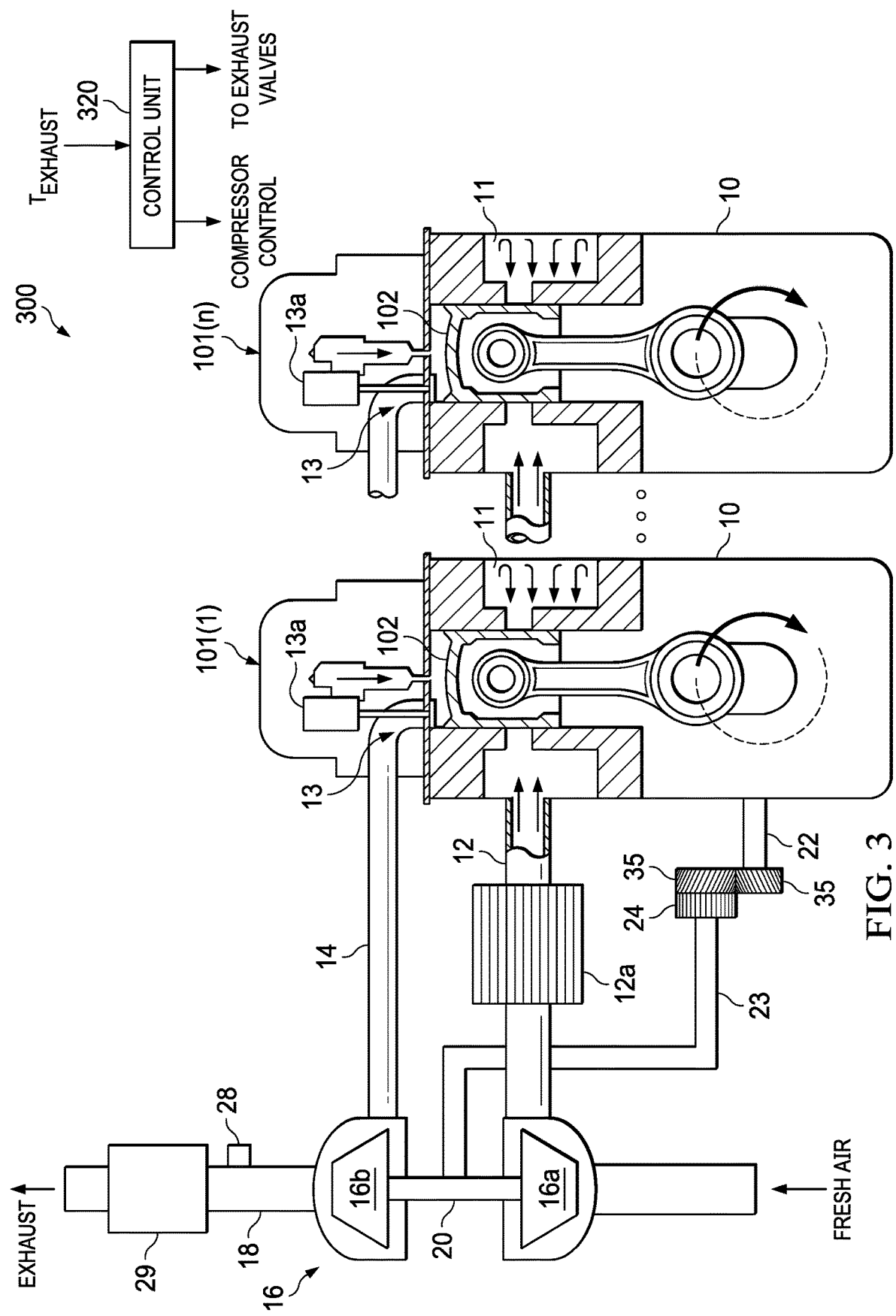
FIG. 3 illustrates an example of a two-cycle uniflow scavenged diesel engine, having variable turbocharger compressor output.

FIG. 3 illustrates a modification of the embodiment of FIG. 1, an engine 300 in which gearbox 15 is replaced with a variable transmission 35. This allows compressor 16a to operate at different speeds at a given engine speed and allows control of intake manifold pressure. The variable transmission may be of various types, such as a stepped or continuously variable transmission.

For exhaust temperature assist at lower loads, the engine of FIG. 3 is operated in a manner similar to that of FIG. 1, but with an added feature of compressor output control. In a uniflow two-stroke engine, there is an overlap period when the piston 102 is close to the bottom of its stroke, and the intake ports are uncovered at the same time that the exhaust valves 13 are open. During this overlap period there is direct communication between the intake plenum 11 and the exhaust system, allowing some intake air to scavenge through the cylinder 101. Intake manifold pressures under normal idle, dynamic brake, and low load conditions push excessive amounts of fresh air through the cylinder 101 during this time. This excessive amount of scavenge cools the exhaust gas flow and requires mechanical compressor work that consumes additional fuel.

A feature of the invention is the recognition that if the intake manifold air pressure is reduced, the short-circuit fresh air flow is reduced, and a higher exhaust gas temperature is maintained and fuel consumption is reduced. This can be accomplished by reducing the speed of compressor 16a.

Figure 4:
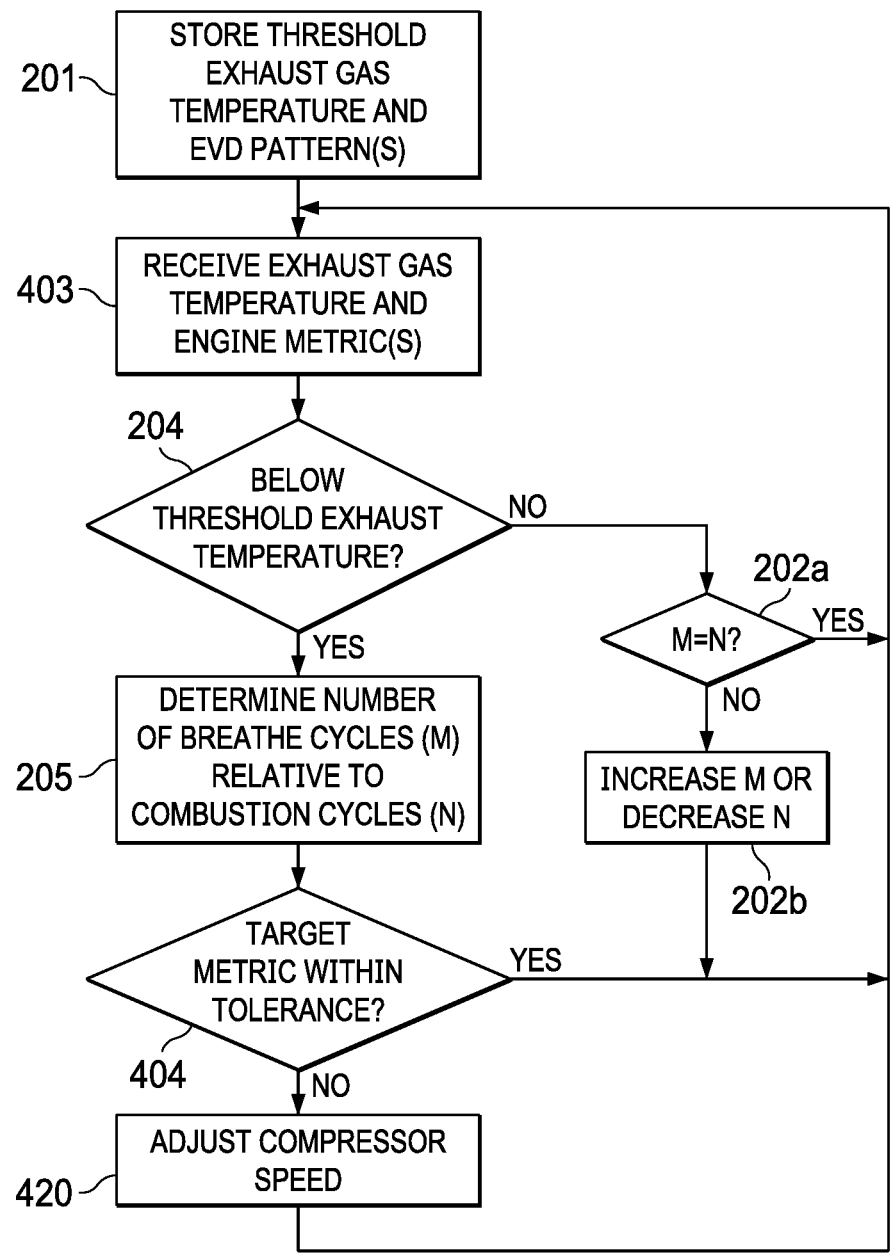
FIG. 4 illustrates a method of increasing exhaust gas temperatures at lower loads, for an engine such as the engine of FIG. 3.

FIG. 4 illustrates a method of operating the engine of FIG. 3 for exhaust temperature assist at lower loads. At lower loads, super turbo-charger 16 is "on gear", with the compressor 16a driven mechanically and not by the exhaust-driven turbine 16b.

The steps of the method of FIG. 4 are similar to those of FIG. 2, except that one of several additional engine metrics may be used to control the speed of compressor 16a. These metrics may include intake manifold pressure, differential pressure between the intake and exhaust manifolds, or overall engine air/fuel ratio, as measured by oxygen content in the exhaust. Additional step 404 compares the engine metric with a set tolerance band. If the metric is within the tolerance band then the control system returns to monitor exhaust gas temperature and the chosen metric in Step 403. If the metric is outside the tolerance band then the speed of compressor 16a is adjusted to achieve the tolerance band. As described above, this has the effect of further increasing exhaust gas temperature as well as reducing compressor work and therefore fuel consumption.

For the method of FIG. 4, control unit 120 is programmed similarly to that of FIG. 2, with the additional feature of generating control signals to the transmission of the compressor.

Referring again to FIG. 3, the variable transmission 35 is used to reduce the speed of shaft 23 to compressor shaft 20. However, the same method may be used with any other two-stroke uniflow scavenged engine having a means for controlling the intake manifold pressure.

Figure 5:
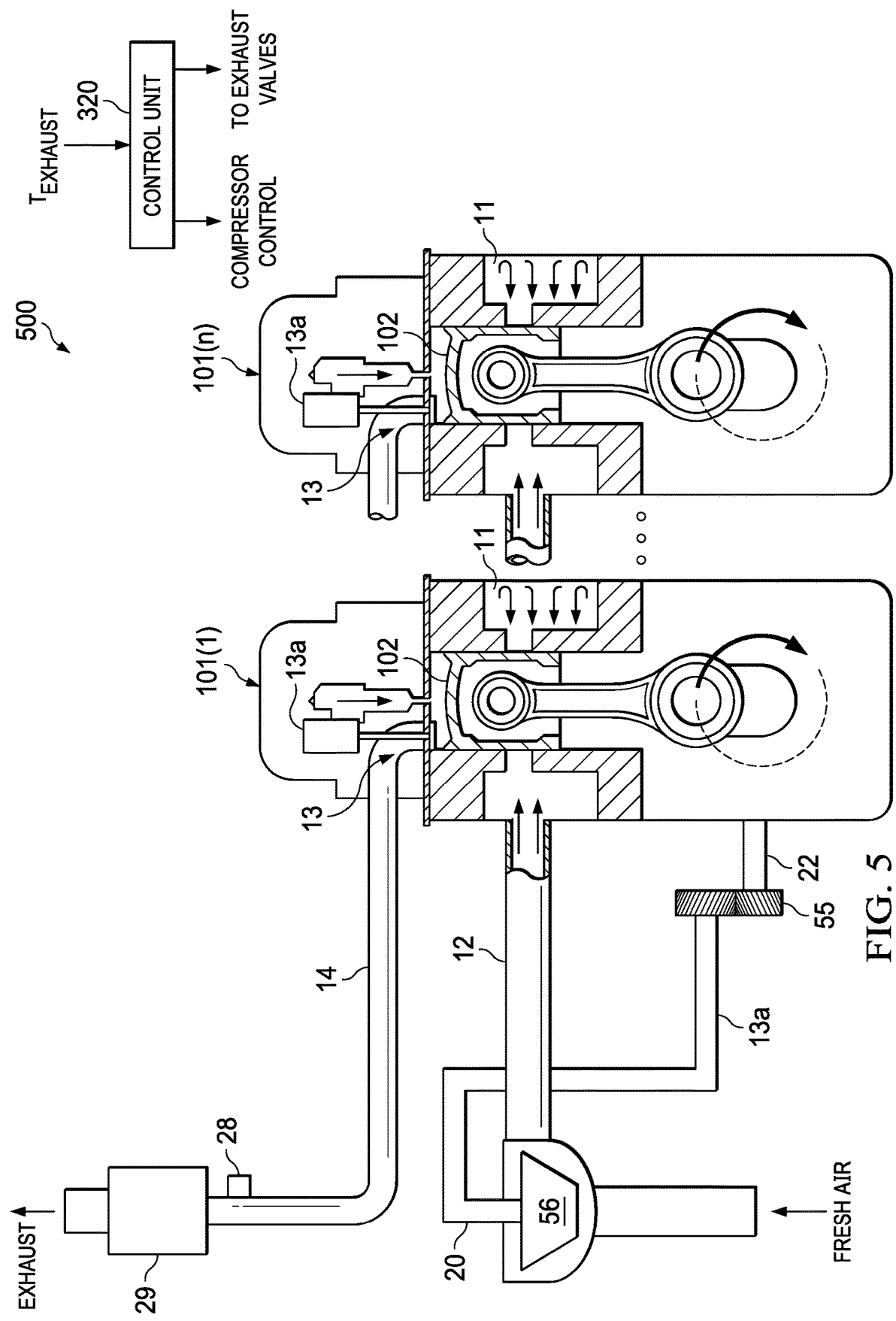
FIG. 5 illustrates another example of a two-cycle uniflow scavenged diesel engine, having a supercharger with variable compressor output, and suitable for use with the method of FIG. 4.

FIG. 5 illustrates a two-cycle uniflow scavenged engine 500, having a supercharger 56. A variable transmission 55 allows the output of supercharger 56 to be controlled. This assumes that supercharger 56 has more airflow output than is necessary to provide forward flow into the intake manifold and through the engine.

Figure 6:
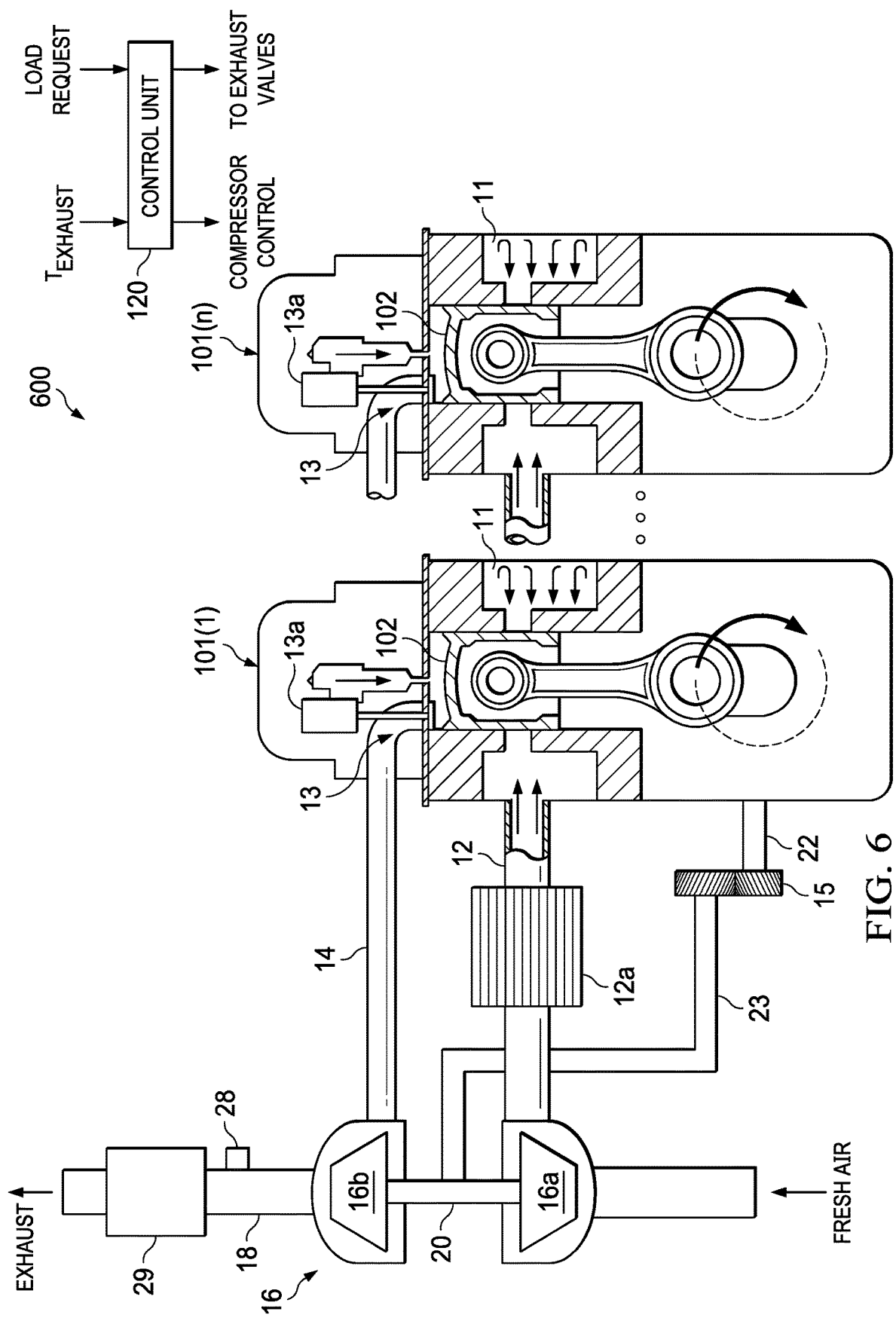
FIG. 6 illustrates an engine like that of FIG. 1, but without an overriding clutch.

FIG. 6 illustrates an engine 600 like that of FIG. 1, but without an overriding clutch. The compressor may be a single speed compressor as in FIG. 1, or variable speed as in FIG. 3. For any of the methods described herein, it is not necessary that the engine have an overriding clutch.

Figure 7:
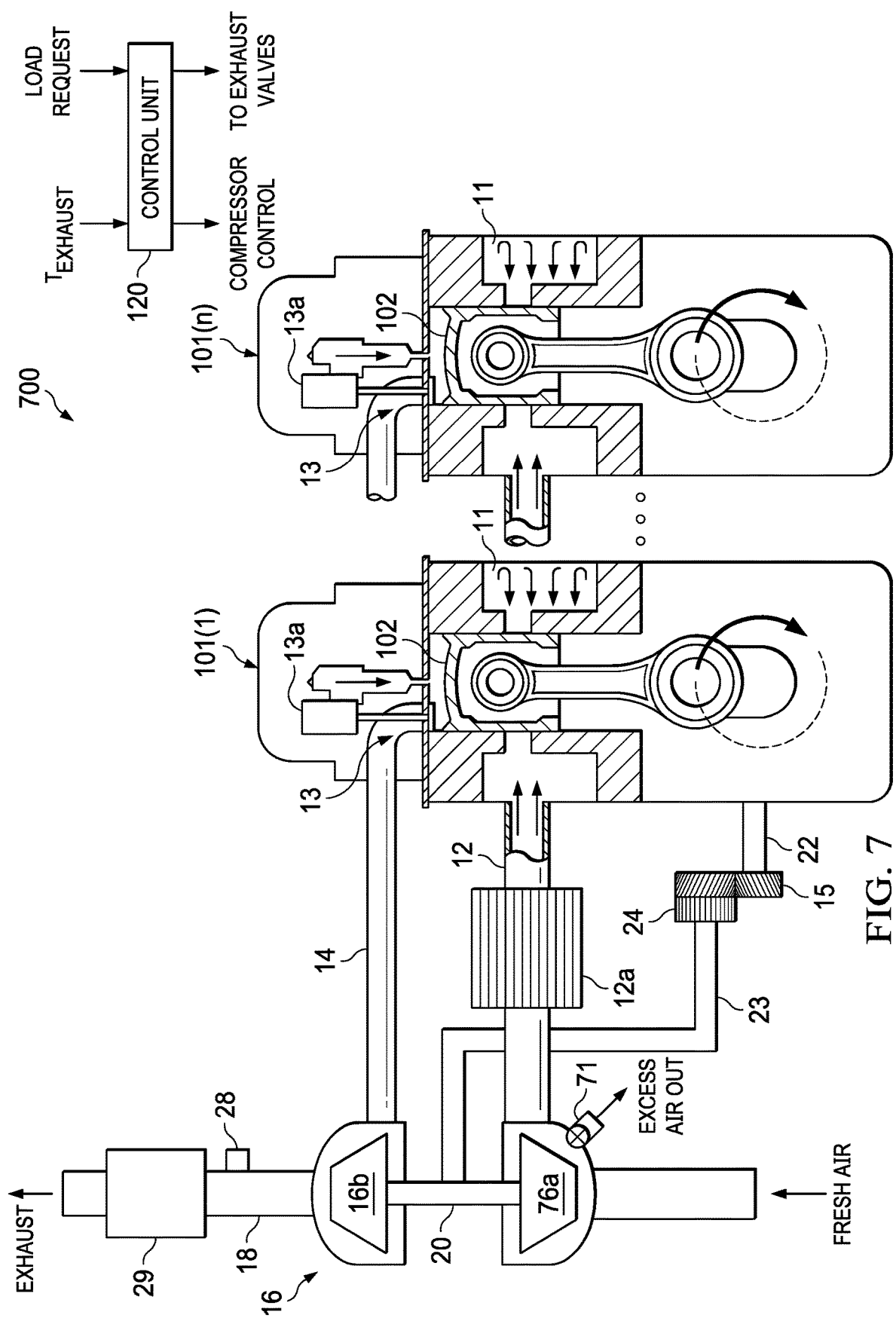
FIG. 7 illustrates an engine like that of FIG. 1 but having a compressor whose output may be bled off upstream the intake manifold.

FIG. 7 illustrates an engine 700 like that of FIG. 1, but having a compressor 76a whose output may be bled off upstream the intake manifold, or other means for bleeding off intake air. In the example of FIG. 7, this is achieved with a bleed port and valve 71. For this engine, at lower loads, the method of FIG. 4 may be used, but with intake manifold pressure reduced by bleeding off intake air rather than by reducing compressor speed, which will assist in increasing exhaust gas temperature. The control unit 120 is programmed to generate appropriate control signals to a valve or other means for controlling bleed off.

It is to be understood that exhaust temperature assist by means of deactivating exhaust valves can be performed with any of the engines described herein, and perhaps others. Exhaust temperature assist by means of reducing intake manifold pressure can also be achieved by any such engine having controllable intake manifold pressure.

Exhaust Valve Deactivation of Fewer than all Cylinders and/or with Fueling Adjustment The various exhaust valve deactivation schemes described in this section, like those described above, are performed at mid to low loads, where it is desired to avoid excessively high air-fuel ratios and low exhaust temperatures.

Exhaust valve deactivation methods may be implemented by deactivating the exhaust valves of fewer than all cylinders. For example, only one cylinder per cycle may have its exhaust valve deactivated during low loads, with deactivation occurring every $2^{nd}$, $3^{rd}$ or nth cycle.

To maintain a desired load, when exhaust valve deactivation is performed, fuel delivery can be adjusted on a cylinder-by-cylinder basis. Furthermore, fuel delivery adjustment may be combined with various exhaust valve deactivation schemes in which not all cylinders are combusting. It is assumed that the engine has appropriate hardware and software so that delivery of fuel to individual cylinders may be accomplished. As explained above, various methods may be used to determine when to implement exhaust valve deactivation, such as by measuring exhaust valve temperature.

One such scheme combines exhaust valve deactivation with fueling adjustment. All cylinders combust (are fueled) during each engine cycle. The exhaust valves of all cylinders are activated with a reduced frequency, such as every $2^{nd}$, $3^{rd}$, or nth engine cycle, rather than on each engine cycle. The amount of fuel delivered to one or more of the cylinders is adjusted to maintain a desired load level.

Other exhaust valve deactivation schemes combine "cylinder deactivation" (the cylinder is not fueled), with exhaust valve deactivation for the remaining cylinders.

In these schemes fewer than all cylinders are "combusting cylinders" and combust each engine cycle. These cylinders also participate in exhaust valve deactivation every $2^{nd}$, $3^{rd}$ or nth engine cycle. The remaining cylinders are non-combusting cylinders, that is deactivated completely, having no combustion and no exhaust valve activation. The amount of fuel delivered to the combusting cylinders may be adjusted independently to maintain a desired load level.

As an example of the operation scheme in the preceding paragraph is Notch 1 of a 16 cylinder engine. Four cylinders could be combusting cylinders each having a fueling level of approximately 16/4 that of 16 cylinder operation at that load level. These cylinders may also participate in exhaust valve deactivation.

When fewer than all cylinders participate in combustion, the choice of which cylinder(s) participate may be varied during the course of engine operation. This facilitates temperature uniformity across the engine.

Variable Speed Electric Motor

Figure 8:
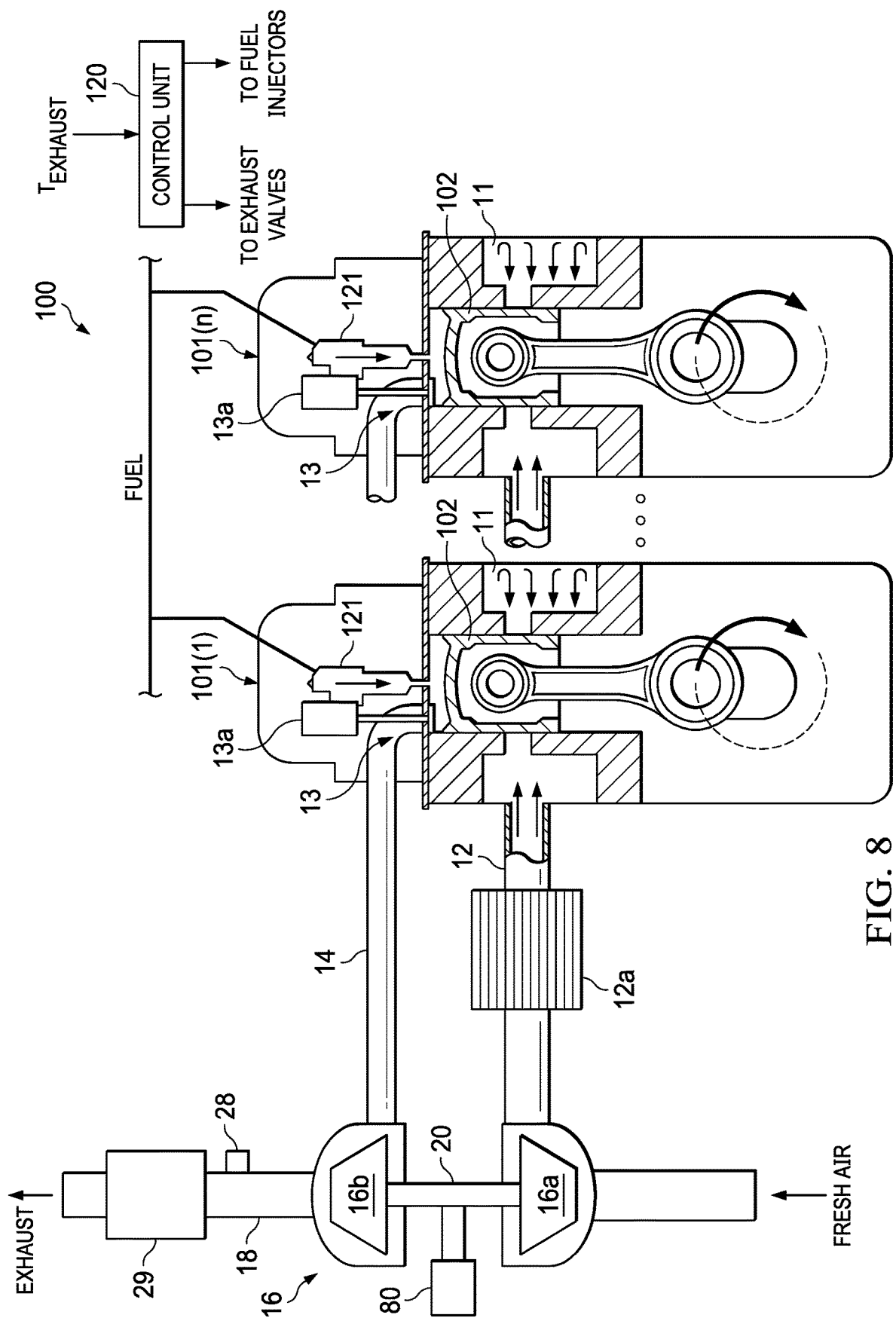
FIG. 8 illustrates an engine like that of FIG. 1, but having a variable speed electric motor to drive the compressor.

FIG. 8 illustrates an engine 800 like that of FIG. 1 but with a variable speed electric motor 80 to drive the control the speed of compressor shaft 20.

For low loads, as described above, it may be desirable to reduce the compressor output. This will ensure unidirectional flow of air through the engine when exhaust valves are activated. The use of an electric motor rather than a mechanical drive for the compressor will improve fuel economy by reducing unnecessary pumping work.

What is claimed is:

1. A controller-implemented method of raising exhaust gas temperatures of a two-cycle uniflow scavenged engine, the engine having a number of cylinders, each cylinder having at least one exhaust valve, comprising:

storing data representing a threshold exhaust gas temperature;

receiving data representing a current exhaust gas temperature;

comparing the current exhaust gas temperature to the threshold exhaust gas temperature;

operating the engine with some or all of the cylinders as combusting cylinders;

if the current exhaust gas temperature is above the threshold exhaust gas temperature, operating all cylinders as combusting cylinders;

if the current exhaust gas temperature is at or below the threshold exhaust gas temperature, operating one or more cylinders as combusting cylinders and activating the at least one exhaust valve of the one or more of the combusting cylinders with a reduced frequency of activation relative to a normal exhaust valve activation; and repeating the receiving, comparing, operating, activating step until the current exhaust gas temperature is above the threshold gas temperature.

2. The method of claim 1, wherein the engine further has a compressor, and further comprising the step of reducing a compressor output if the current exhaust gas temperature is at or below the threshold exhaust gas temperature.

3. The method of claim 2, wherein the compressor is a variable speed compressor.

4. The method of claim 2, wherein the compressor is a compressor of a supercharger or blower.

5. The method of claim 2, wherein the compressor is driven by a variable output electric motor.

6. The method of claim 1, wherein the engine has a compressor and a compressor output bleed line, and further comprising the step of bleeding off the compressor output if the current exhaust gas temperature is at or below the threshold exhaust gas temperature.

7. The method of claim 1, wherein the engine is a production Electro-Motive Diesel (EMD) engine.

8. The method of claim 1, wherein the threshold exhaust gas temperature is represented by a load level.

9. The method of claim 1, wherein the current exhaust gas temperature is measured with a temperature sensor.

10. The method of claim 1, wherein the current exhaust gas temperature is estimated from a current load level of the engine.

11. The method of claim 1, further comprising, if the current exhaust gas temperature is at or below the threshold exhaust gas temperature, operating all cylinders as combusting cylinders and apportioning an amount of fuel delivered to the combusting cylinders to maintain a desired load level.

12. The method of claim 1, further comprising, if the current exhaust gas temperature is at or below the threshold exhaust gas temperature, operating fewer than all cylinders as combusting cylinders and increasing an amount of fuel delivered to the combusting cylinders.

13. The method of claim 1, further comprising, if the current exhaust gas temperature is at or below the threshold exhaust gas temperature, operating fewer than all cylinders as combusting cylinders and alternating among engine cycles which cylinders are combusting cylinders.

14. An improved two-cycle uniflow scavenged engine, the engine having a number of cylinders, each cylinder having one or more exhaust valves, the engine further having at least one exhaust aftertreatment device, comprising:
an actuator for activating and deactivating the one or more exhaust valves;
a control unit programmed to perform the following tasks:
storing data representing a threshold exhaust gas temperature; receiving a value representing a current exhaust gas temperature; comparing the current exhaust gas temperature to the threshold exhaust gas temperature; if the current exhaust gas temperature is above the threshold exhaust gas temperature, operating all cylinders as combusting cylinders; if the current exhaust gas temperature is at or below the threshold exhaust gas temperature, operating one or more cylinders as combusting cylinders and activating the one or more exhaust valves of the one or more of the combusting cylinders with a reduced frequency of activation relative to a normal exhaust valve activation; and repeating the receiving, comparing, operating, activating step until the current exhaust gas temperature is above the threshold gas temperature.

15. The engine of claim 14, wherein the engine has a compressor, and wherein the control unit is further programmed to control the compressor to reduce a compressor output if the current exhaust gas temperature is at or below the threshold exhaust gas temperature.

16. The engine of claim 15, wherein the compressor is a variable speed compressor.

17. The engine of claim 15, wherein the compressor is a compressor of a supercharger or blower.

18. The engine of claim 14, wherein the engine has a compressor output bleed valve, and wherein the control unit is further programmed to control the compressor output bleed valve if the current exhaust gas temperature is at or below the threshold exhaust gas temperature.

19. The engine of claim 14, wherein the threshold exhaust gas temperature is represented by a load level.

20. The engine of claim 14, further comprising an exhaust gas temperature sensor, and wherein the current exhaust gas temperature is measured with a temperature sensor.

* * * * *